US012746724B2

(12) United States Patent
Diosdado Borrego et al.

(10) Patent No.: US 12,746,724 B2
(45) Date of Patent: Sep. 29, 2026

(54) ADDITIVE MANUFACTURING SYSTEMS

(71) Applicant: Peridot Print LLC, Palo Alto, CA (US)

(72) Inventors: Jorge Diosdado Borrego, Sant Cugat del Valles (ES); Sergio Puigardeu Aramendia, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 480 days.

(21) Appl. No.: 18/139,186

(22) Filed: Apr. 25, 2023

(65) Prior Publication Data

US 2024/0359408 A1 Oct. 31, 2024

(51) Int. Cl.

| | |
|---|---|
| ***B29C 64/393*** | (2017.01) |
| ***B29C 64/165*** | (2017.01) |
| ***B29C 64/205*** | (2017.01) |
| ***B29C 64/295*** | (2017.01) |
| ***B33Y 10/00*** | (2015.01) |
| ***B33Y 30/00*** | (2015.01) |
| ***B33Y 50/02*** | (2015.01) |

(52) U.S. Cl.

CPC .......... *B29C 64/393* (2017.08); *B29C 64/165* (2017.08); *B29C 64/205* (2017.08); *B29C 64/295* (2017.08); *B33Y 10/00* (2014.12); *B33Y 30/00* (2014.12); *B33Y 50/02* (2014.12)

(58) Field of Classification Search

CPC ................ B29C 64/393; B29C 64/165; B29C 64/205; B29C 64/295; B33Y 10/00; B33Y 30/00; B33Y 50/02

See application file for complete search history.

(56) References Cited

U.S. PATENT DOCUMENTS

| | | | | |
|---|---|---|---|---|
| 11,014,163 | B2 | 5/2021 | Preston et al. | |
| 2017/0056138 | A1* | 3/2017 | Zandinejad .............. | A61K 6/15 |
| 2018/0009171 | A1* | 1/2018 | Donovan ............... | B33Y 50/02 |
| 2021/0170483 | A1* | 6/2021 | Hudelson ............... | B33Y 40/00 |
| 2021/0331415 | A1* | 10/2021 | Barnes .................... | B33Y 50/02 |
| 2022/0080508 | A1* | 3/2022 | Champion ............. | B22F 12/30 |

OTHER PUBLICATIONS

Kafara et al. "Influence of Binder Quantity on Dimensional Accuracy and Resilience in 3D-Printing" from "Procedia Manufacturing 21 (2018) 638-646" (Year: 2018).*

* cited by examiner

*Primary Examiner* — Yuhui R Pan
(74) *Attorney, Agent, or Firm* — Michael Dryja

(57) ABSTRACT

According to an example, a method for setting print parameters for a subsequent printing operation may comprise forming a layer of powder, printing a plurality of patches on the formed layer, obtaining sensor data corresponding to at least two patches of the plurality of patches, determining for each of the at least two of the plurality of patches characteristics of the interaction between the printing liquid and powder in the formed layer based on the obtained sensor data, and setting the print parameters based on the determined characteristics of the interaction.

18 Claims, 3 Drawing Sheets

ADDITIVE MANUFACTURING SYSTEMS

BACKGROUND

Additive manufacturing systems such as three-dimensional printing systems typically generate three-dimensional (3D) objects through selective solidification of a build material on a layer-by-layer basis according to a digital 3D object model. In some examples, printheads may selectively deposit printing liquid, such as fusing agents or binder agents, onto regions of a layer of build material that are to become layers of an object being generated.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
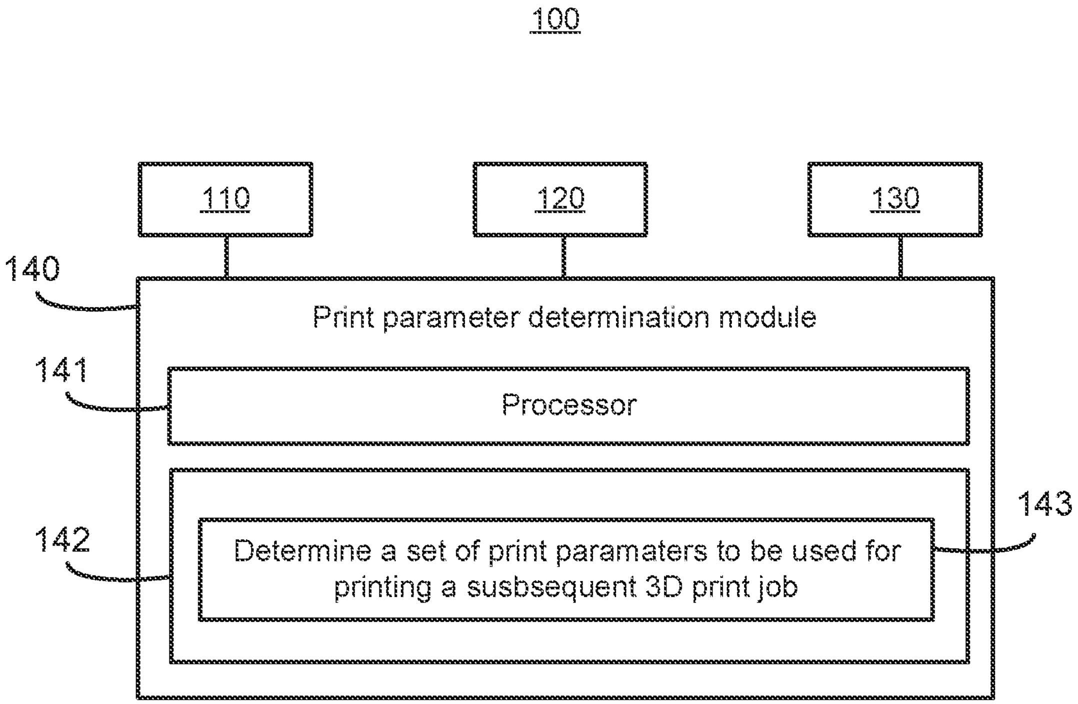
FIG. 1 shows a schematic drawing illustrating an additive manufacturing system including a printing liquid dispenser, a build material dispenser, a sensor, and a print parameter determination module, according to an example.

For simplicity and illustrative purposes, the present disclosure is described herein by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Additive manufacturing, or three-dimensional printing, systems may generate three-dimensional objects through the solidification of build material. In some additive-manufacturing systems the build material is a powder-like granular material, such as a plastic, ceramic, or metal powder, and the properties of generated objects may depend on the type of build material and the type of solidification mechanism used.

Some additive manufacturing systems selectively apply a printing liquid, such as a binder agent, to form a matrix of build material particles bound together by the binder agent. In some such systems heat can be applied, for example either during the printing process or after the printing process has completed, to at least partially cure and/or dry part of a layer where printing liquid has been applied to form, or at least partially form, the matrix, thereby generating so-called "green parts". Once suitably cleaned, green parts may be sintered in a furnace to form highly dense final parts.

To apply printing liquid onto portions of a layer of build material, additive manufacturing systems typically use printing liquid dispensers such as printheads. Depending on the type of printhead used, an additive manufacturing system may use a single printhead or an array of printheads. In some systems, a printhead, or an array of printheads, may span a width of a build chamber in which a printing process is conducted.

Printing liquid dispensers are used to selectively dispense printing liquid on a layer of powder. The dispensing operation may be conducted during a single printing pass of the printing liquid dispenser over the powder bed or during a plurality of printing passes over the same powder layer. When dispensing printing liquid over multiple printing passes, a printing liquid dispenser may eject a first portion of printing liquid onto regions of the powder bed during a forward printing pass and a second portion of printing liquid onto regions during a reverse printing pass. As used herein, the first portion of printing liquid ejected during a first printing pass (i.e., the forward printing pass) is referred to as first proportion and the second portion of printing liquid ejected during a second printing pass (i.e., the reverse printing pass) is referred to as second proportion.

As used herein, the term "powder bed" refers to a set of layers of powdered build material used to generate a three-dimensional object within a process chamber of an additive manufacturing system (e.g., a three-dimensional printing system). It will be appreciated that the techniques described herein may not be limited for use with powdered build material and may also apply to other types or preparations of build material, such as slurries. The term "process chamber" refers to an element of the additive manufacturing system defining a volume in which the generation of a three-dimensional object is performed.

When dispensing printing agents (e.g., liquid fusing agents or liquid binder agents), additive manufacturing systems are typically configured to not dispense more than a predetermined quantity of printing agent per unit of area on regions of the powder bed. This maximum printing agent density is referred to herein as the maximum contone level. Typically, the maximum contone level is determined by the additive manufacturing system manufacturer through experimentation. The maximum contone value is typically the maximum quantity of printing agent that may be printed per unit area of a given powder without the printing liquid accumulating (or pooling) on the powder surface after some predetermined time. In other words, when dispensing printing agents on a powder layer at the maximum contone level substantially all of the printing liquid is absorbed into the powder layer immediately upon, or within a relatively short time period following, dispensing of printing agent. Different combinations of powder and printing liquid may lead to the establishment of a different maximum contone level.

During a printing liquid dispensing operation, dispensing excessive quantities of printing agent per unit of area may result in part quality defects on the resulting 3D object. Likewise, printing liquid dispensing operations using excessively low quantities of printing agent per unit of area may result in part quality defects, such as low mechanical properties, on the resulting 3D object.

In additive manufacturing systems it is common for build material powder that is not solidified into a 3D object to be recovered and be reused in subsequent print jobs. Subsequent print jobs may typically be performed using either entirely reused build material powder, or a mix of fresh and reused build material powder. Subsequent printing operations may involve the performance of a print job to generate one or more 3D objects.

It has been observed, however, that the characteristics of reused build material powder, or a combination of fresh and reused powder, may differ from the characteristics of fresh powder. In some cases, the characteristics of fresh powder may also change over time. Examples of powder characteristics include an average particle size, a composition of the powder, and a flowability level. It has been further observed that some characteristic changes modify the interaction between the printing agents and the powder which can lead to the predetermined maximum contone level determined by the system manufacturer for a given powder type to be non-optimal, which can in turn cause quality issues in green parts, as explained above.

Disclosed herein are examples of an additive manufacturing system calibration process that can be performed to determine additive manufacturing system print parameters to be used for subsequent printing operations in which 3D objects are generated.

Referring now to FIG. 1, an additive manufacturing system 100 according one example is shown. The additive manufacturing system 100 comprises a build material dispenser 110, a printing liquid dispenser 120, a sensor 130, and a print parameter determination module 140.

The build material dispenser 110 may be any suitable type of apparatus for forming a layer of powder, or other suitable build material, on a build platform within a build chamber. Such apparatus may include one or more of a powder supply mechanism, a recoater roller and a wiper blade.

The sensor 130 may be any suitable type of sensor capable of obtaining data relating to the uppermost powder layer formed by the build material dispenser 110. Suitable sensors may include, for example, an imaging device in the form of at least one camera or line scanner to obtain image data of the uppermost powder layer, a height sensor to obtain data relating to variations in height of different locations of the uppermost powder layer, a temperature sensor to obtain data relating to variations in temperature of different locations of the uppermost powder layer.

The print parameter determination module 140 is operatively connected to each of the build material dispenser 110, the printing liquid dispenser 120, and the sensor 130. In some examples, the print parameter determination module 140 may be implemented by a controller of the additive manufacturing system 100.

In FIG. 1, the print parameter determination module 140 comprises a processor 141, such as a microprocessor, a microcontroller, or the like, that is coupled to a memory 142. The memory 142 stores processor-readable instructions 143 that, when executed by the processor 141, cause the processor 141 to control at least parts of the additive manufacturing system 100 to determine a set of print parameters to be used for printing a subsequent 3D print job, as illustrated in the method 200 shown in the flow diagram of FIG. 2.

Figure 2:
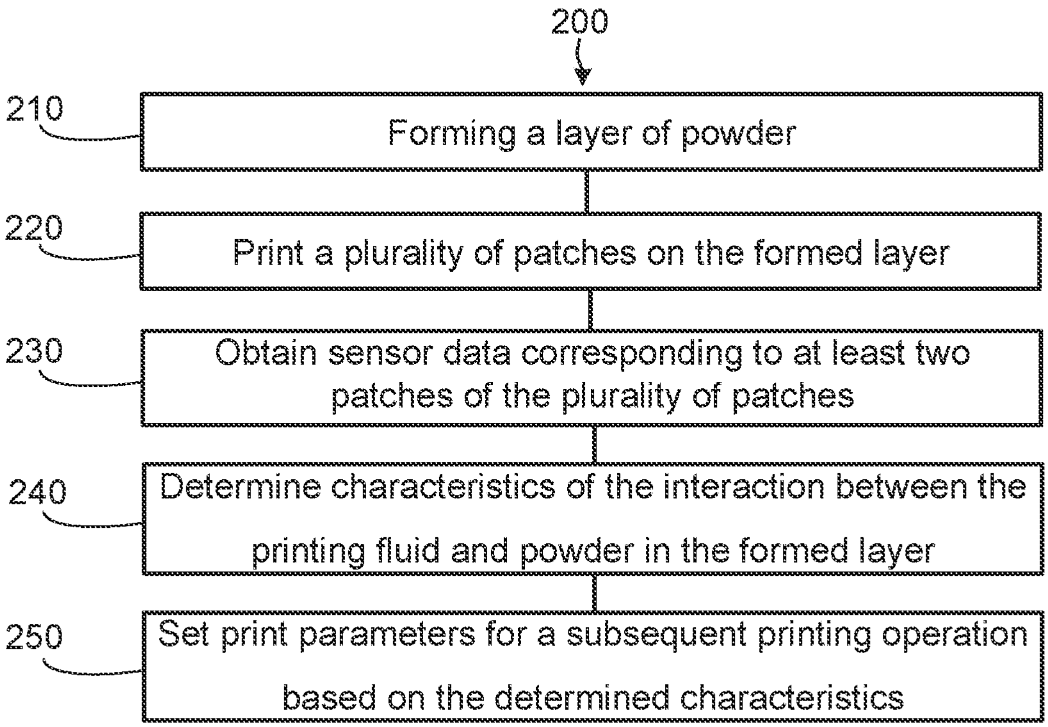
FIG. 2 shows a flow diagram outlining an example method for setting print parameters for a subsequent printing operation according to an example.

Example operation of the print parameter determination module 140 will now be described in further detail with reference to method 200 of FIG. 2 and with additional reference to method 340 of FIG. 3. Furthermore, additional reference to the plurality of patches printed during a calibration operation will be provided with reference to FIGS. 4 and 5.

At block 210, the module 140 controls the build material dispenser 110 to form a set of powder layers. In an example, the module 140 controls the build material dispenser 110 to form an initial layer of powder on a support platform (e.g., a build platform) in a build chamber of the additive manufacturing system 100 and to form each subsequent layer on the previously formed layer. At block 220, the module 140 controls the printing liquid dispenser 120 to print a plurality of patches on the uppermost formed layer, each of the patches being formed using a quantity of printing liquid.

In the present example, each of the patches is formed using a different amount of printing liquid, meaning that the average print density (or contone level) for each patch is different. In other examples some patches may be formed using the same amount of printing liquid as another patch. In some other examples, each of the patches may be formed by dispensing different proportions of the printing liquid in each of the passes. In further examples, the patches may be formed such that at least two of the patches are formed using a different average print density (or contone level) and/or using different proportions of the dispensed printing liquid over each of the passes. In one example, each patch may be formed such that the pattern of printing liquid drops used to form the patch is substantially the same through the whole patch, in an analogous manner to how in 2D printing a uniform colour patch is formed.

Figure 4:
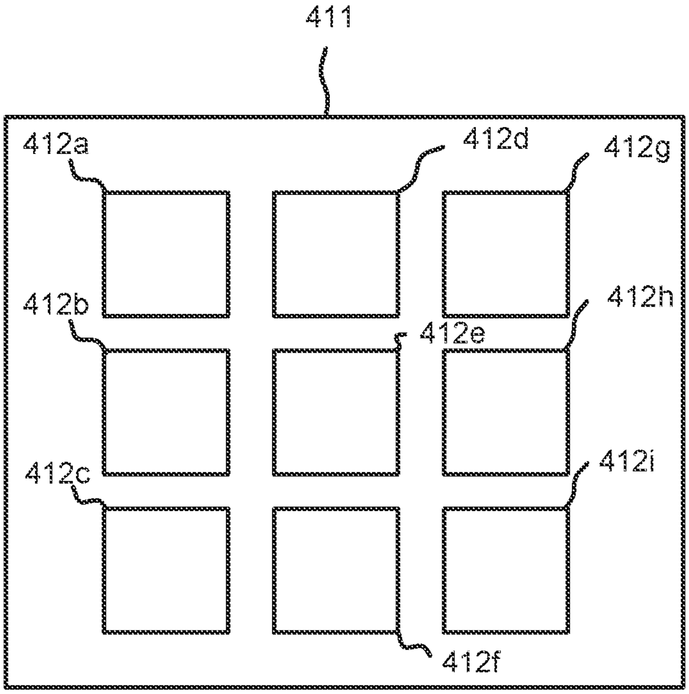
FIG. 4 shows a schematic drawing illustrating a top view of a powder bed including locations of a plurality of patches according to an example.
Figure 5:
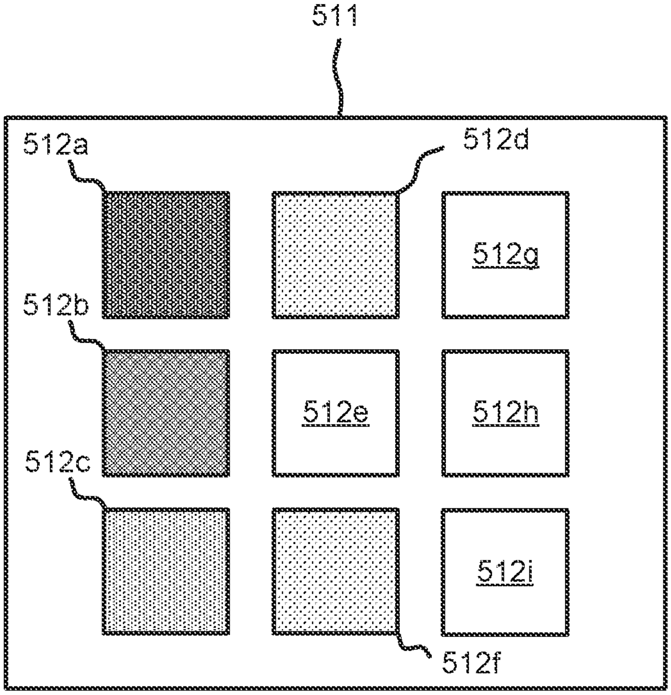
FIG. 5 shows a schematic drawing illustrating a powder bed including a plurality of patches of printing liquid a predetermined time after the plurality of patches have been formed, according to an example.

The print parameter determination module 140 may control elements of the additive manufacturing system to form the above-described patches in any suitable manner, which may include directly controlling or inputting data to an internal printing pipeline. FIGS. 4 and 5 illustrate a plurality of patches 412*a* to 412*i* and 512*a* to 512*i* formed by the additive manufacturing system 100 on a powder bed 411 and 511. In the present example, the print parameter determination module 140 defines only the size and location of each of the patches along with the printing density (or contone level) to be used to form each of the patches. The internal printing pipeline may determine, for each of the patches and based on the print density to be used for each patch, whether a patch is to be formed using a single pass or using multiple passes. If the printing pipeline determines that a patch is to be formed using multiple printing passes the printing pipeline will also determine what proportion of the printing liquid is to be dispensed in each of the printing passes to form the patch in question. However, in other examples, the module 140 may control elements of the additive manufacturing system 100 to specify the number of printing passes with which each patch is to be formed and also the proportion of printing liquid that is to be used in each printing pass.

At block 230, the module 140 controls the sensor 130 to obtain sensor data corresponding to at least two patches of the plurality of patches that have been formed.

At block 240, the module 140 processes the sensor data obtained at block 230 to determine, for each of the at least two patches of the plurality of patches, characteristics of the interaction between the printing liquid and powder in the layer of powder formed at block 210.

In the present example, the sensor data is visual data obtained using a camera or other suitable imaging module, and processing the data comprises using image analysis techniques to determine whether any printing liquid had not fully infiltrated into the powder layer at the time the image data was obtained (in other words, determining, or at least estimating, the amount of printing liquid, if any, remaining on the powder layer surface). In one example, this may be achieved by illuminating the powder layer using a light source when the image data is obtained, and detecting differences in light characteristics of the image data, such as difference in brightness, contrast, colour, etc. to identify the presence of printing liquid on the surface of the powder layer. In one example, characteristics of the interaction between the printing liquid and the powder for a given patch may be determined using one or more of the quantity of printing liquid used to form each patch, the elapsed time between the patch being formed and the sensor obtaining sensor data, and the determined amount of printing liquid on the powder layer surface in the region of the patch.

At block 250, the module 140 is to set, based on the determined characteristics of interaction, print parameters to be used for a subsequent printing operation. In an example, the subsequent printing operations may include printing operations in which the same batch of powder in the layer of powder formed during the above-described process is used. In one example, setting the print parameters includes determining a maximum contone level, or maximum printing density, that is to be used when printing a subsequent print job. A subsequent print job may, for example, be performed on powder layers formed on top of the already formed powder layers as described above. In another example, a subsequent print job may be performed in a new or clean build chamber. In some other examples, setting the print parameters may comprise setting the determined maximum contone level as the maximum contone level to be used for the subsequent printing operations, determining a number of printing passes to be used to form one or more of the patches using the maximum contone level and determining a proportion of the printing fluid to be dispensed in each of the passes. In some other examples, the determination of the number of passes to be used to dispense the determined amount of printing liquid may be performed using a printing pipeline.

In some examples, at block 240 of method 200 the module 140 may determine, by processing sensor data obtained at block 230, in which of the formed patches the printing liquid has substantially infiltrated. As used herein, the expression "patches in which the printing liquid has substantially infiltrated" is to be interpreted as the patches in which the printing liquid dispensed by the printing fluid dispenser has effectively infiltrated into the powder such that the dispensing operation does not result in pooling on the patch (i.e., a layer of printing fluid on top of the patch).

In some other examples, the obtention of the sensor data may take into account the time when each patch is formed and when the sensor data is obtained. As a result, the time differences between a time of formation and a time when the sensor data is obtained are considered in the determination.

Figure 3:
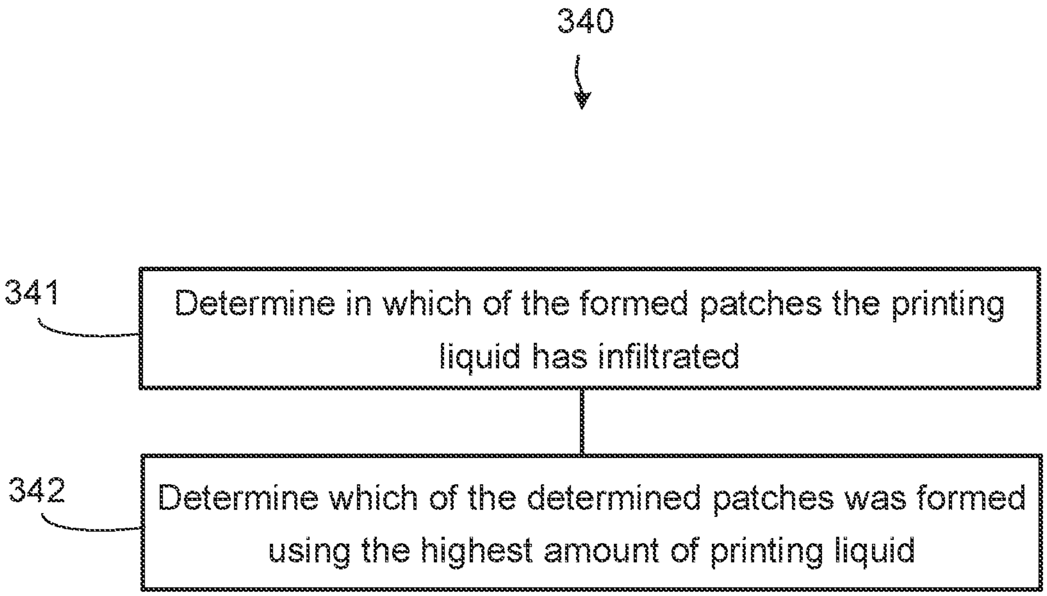
FIG. 3 shows a flow diagram outlining an example method for determining characteristics of the interaction between printing liquid and powder from a powder bed according to an example.

Referring now to FIG. 3, part of process performed by the module 140 is shown in further detail in method 340. At block 341, the module 140 is to determine by processing the obtained sensor data, in which of the formed patches the printing liquid is determined to have substantially fully infiltrated. In some examples, the patches in which the printing liquid has substantially infiltrated may be referred to as undersaturated patches. To identify the patches in which the printing liquid has substantially infiltrated at block 341, the module 140 may process the sensor data obtained at block 230. Then, at block 342, the module 140 is to determine which of the determined patches was formed using the highest amount of printing liquid. The patch determined at block 342 indicates, for the batch of powder used, the highest printing liquid density that may be used at which all, or substantially all, of the printing liquid infiltrates, or is otherwise absorbed, into the powder layer. In some examples, setting the print parameters at block 250 of method 200 may comprise setting a maximum contone level for the subsequent printing operation based on the determined highest amount of printing liquid.

In some examples, determining characteristics of the interaction between the printing liquid and powder in the layer of powder at block 240 of method 200 may comprise the module 140 performing blocks 341 and 342 of method 340.

Referring now to FIG. 4, a powder bed 411 including locations for a plurality of patches 412*a* to 412*i* is shown. The patches 412*a* to 412*i* may correspond to the patches formed when the module 140 performs block 220 of method 200 described above. As previously explained, each of the patches 412*a* to 412*i* is formed with predetermined quantities of printing liquid and/or in a predetermined manner. In some examples, at least two of the patches 412*a* to 412*i* may be formed by using different quantities of printing liquid and/or by dispensing the printing liquid in a different manner.

In the present example, the plurality of patches each have a quadrilateral form of the same dimensions and are arranged in a grid structure with each of the patches being separated by a short distance from other patches. The dimensions of each of the patches may be in the range of about 1 to 10 cm, although in other examples smaller or larger patches may be used. In other examples, other shapes and spatial distributions of patches may be used. Examples of alternative geometries include a rectangular shape, a triangular shape, a pentagonal shape, among others. In some other examples, each patch of the plurality of patches may be adjacent to at least a neighboring patch.

In some examples, the quantities of printing liquid used to form the patches 412*a* to 412*i* may be within a predetermined printing liquid range. In an example, this printing liquid range may be associated with properties of the powder forming the powder bed and/or an operative range associated with the printing liquid dispenser (e.g., range of printing liquid dispensable by the printing liquid dispenser).

In other examples, the printing liquid dispenser (e.g., printing liquid dispenser 120 in the additive manufacturing system 100 in FIG. 1) is to form the patches during a plurality of passes of the printing liquid dispenser over the powder bed 411 and the print parameter determination module (e.g., module 140 in system 100) is to control the printing liquid dispenser to incrementally modify the quantities of printing liquid ejected onto the plurality of patches over a pass of the plurality of passes.

In some other examples, the printing liquid dispenser 120 is to dispense printing liquid on the powder bed during a plurality of passes and, during at least one pass of the plurality of passes, the print parameter determination module 140 is to control the printing liquid dispenser 120 to form the patches by ejecting at least two different quantities of printing liquid during at least one pass of the plurality of passes.

In further examples, printing the plurality of patches 412*a* to 412*i* comprises forming a plurality of layers and printing subsequent plurality of patches identical with each other in each of the layers. As used herein, the term "identical with each other" refers to forming a subsequent plurality of patches using the same quantities of printing liquid and/or proportions of printing liquid. In an example, method 200 may further comprise forming an additional layer of powder on top of the previously formed layer, printing a subsequent plurality of patches on the additional layer, the subsequent plurality of patches being identical to the plurality of patches, and obtaining sensor data corresponding to at least two patches of the subsequent plurality of patches. Accordingly, when printing the subsequent plurality of patches on the further layer, the characteristics of the interaction between the printing fluid and powder in the formed layer may take into account the sensor data corresponding to the plurality of patches on the layer formed at block 210 and the sensor data corresponding to the at least two patches of the subsequent plurality of patches.

According to some examples, printing liquid may infiltrate in a different manner into a powder bed when dispensed during a single pass or during multiple passes. For example, printing liquid applied in a first pass may "pre-wet" the powder making the application of printing liquid applied in a second pass to be absorbed into the powder layer faster than the printing liquid applied in a first pass. The time delay between the first printing pass and the second printing pass may influence powder and printing liquid interaction characteristics. In some examples, printing the plurality of patches on the powder at block 220 of method 200 comprises at least one of forming at least one patch during multiple printing passes, forming at least two patches with different quantities of printing liquid, and forming each of at least two patches with a different delay between a first pass in which a first proportion of the quantity of printing liquid is deposited and a second pass in which a second proportion of the quantity of printing liquid is deposited.

Referring now to FIG. 5, a powder bed 511 including a plurality of patches 512*a* to 512*i* is shown. The powder bed 511 corresponds to the powder bed 411 previously explained in FIG. 4 a predetermined time after the plurality of patches 412*a* to 412*i* have been formed. The predetermined time may correspond to a time between the formation of the plurality of patches 512*a* to 512*i* and the formation of a subsequent layer of build material on top of the powder bed 511.

In FIG. 5, the first patch 512*a*, the second patch 512*b*, the third patch 512*c*, the fourth patch 512*d*, and the sixth patch 512*f* are represented with a dotted pattern. The degree of transparency of each of the dotted patterns represents a quantity of printing liquid present on top of the patch. As previously explained, excessive quantities of printing liquid may cause printing liquid to pool, or accumulate, thereon. Accordingly, the first patch 512*a* includes the greatest quantity of pooled printing liquid, the third patch 512*c* includes the second greatest quantity of pooled printing liquid, the second patch 512*b* includes the third greatest quantity of pooled printing liquid, the sixth patch 512*f* includes the fourth greatest quantity of pooled printing liquid, and the fourth patch 512*d* includes the fifth greatest quantity of pooled printing liquid.

The plurality of patches 512*a* to 512*i* further comprises four patches in which the formation does not result in pooling of printing liquid. In FIG. 5, these patches (i.e., the fifth patch 512*e*, the seventh patch 512*g*, the eighth patch 512*h*, and the ninth patch 512*i*) are not represented using a dotted pattern. As used herein, patches 512*e*, 512*g* and 512*h* may be referred to as patches in which the printing liquid has infiltrated.

In the example shown in FIG. 5, the fourth patch 512*d* and the sixth patch 512*f* were formed during a single pass over the powder bed 511A and the fifth patch 512*e* was formed during multiple passes over the powder bed 511. The seventh patch 512*g* was formed during only during a first pass over the powder bed 511 and the eight patch 512*h* and the ninth patch 512*i* were formed only during a second pass over the powder bed 511.

Referring back to FIG. 1, the sensor 130 of the additive manufacturing system 100 may obtain sensor data corresponding to at least two patches of the plurality of patches 512*a* to 512*i* and a print parameter determination module 140 may determine characteristics of the interaction between the printing liquid and powder in the formed layer based on the obtained sensor data. In an example, determining characteristics of the interaction at block 240 of method 200 may comprise the module 140 to identify a set of undersaturated patches and a set of oversaturated patches in the plurality of patches 512*a* to 512*i*. As used herein, "oversaturated patches" refers to patches for which some of the printing liquid has not infiltrated into the powder a predetermined time after the patches being formed and "undersaturated patches" refers to patches in which the printing fluid has infiltrated.

In the example of FIG. 5, the set of undersaturated patches may include the patches in which the printing fluid has infiltrated so that the patches which do not have a layer of printing liquid thereon (i.e., the fifth patch 512*e*, the seventh patch 512*g*, the eighth patch 512*h*, and the ninth patch 512*i*). The set of oversaturated patches may include the patches having a layer of printing liquid thereon (i.e., the first patch 512*a*, the second patch 512*b*, the third patch 512*c*, the fourth patch 512*d*, and the sixth patch 512*f*).

In some examples, a print parameter determination module (e.g., module 140 in system 100) may determine a contone level for a subsequent printing operation based on the identified undersaturated and oversaturated patches. In an example, determining characteristics of the interaction between the printing liquid and powder in the formed layer at block 240 of method 200 may comprise the module to identify a set of undersaturated patches and a set of oversaturated patches in the plurality of patches and the module to determine a highest contone level based on a highest amount of printing liquid used for one of the identified set of undersaturated patches and a lowest contone level based on a lowest amount of printing liquid used for one of the identified set of oversaturated patches.

According to an example, a sensor of an additive manufacturing system may be in the form of an imaging device. In an example, the imaging device may obtain a plurality of images of a powder bed, each of the images including at least one patch of the plurality of patches and being obtained a predetermined time after the printing of the at least one patch included in the image is completed. As a result, even though each of the patches may be formed at different times, the sensor data resulting from the plurality of images obtained by the imaging device may be under similar conditions (i.e., the images associated to each of the patches is taken after a predetermined time after the formation).

According to other examples, a temperature within a print chamber of an additive manufacturing system may impact the maximum absorbable quantity of printing liquid of the powder bed. Hence, to effectively determine the optimal quantity of printing liquid, a heating device may be used during a calibration operation to control a temperature within the process chamber of an additive manufacturing system (e.g., system 100 of FIG. 1). In some examples, the additive manufacturing system may comprise a heating device to control a temperature of the process chamber including the powder bed. In an example, a print parameter determination module (e.g., module 140) may control the heating device to control a temperature of the uppermost layer of the powder bed to be within a predetermined temperature range associated with the subsequent printing operations. Examples of a predetermined temperature range may be a range from 40° C. to 120° C. (e.g., 60° C. to 100° C.). Examples of heating devices comprise heating lamps which apply energy to the uppermost layer forming the powder bed.

According to some other examples, system components and methods previously described may be implemented by way of non-transitory computer program code that is storable on a non-transitory storage medium. Examples of computer-readable media include, for example, electronic, magnetic, optical, electromagnetic, or semiconductor media. Other examples of suitable computer-readable media include a hard drive, a random-access memory (RAM), a read-only memory (ROM), memory cards and sticks, and other portable storage devices.

According to an example, a computer-readable medium may comprise instructions that, when executed by a processor, cause the processor to perform actions. Examples of actions comprise blocks 210, 220, 230, 240, and 250 previously explained in reference to method 200 of FIG. 2 and blocks 341 and 342 previously explained in reference to method 340 in FIG. 3. Accordingly, the instructions may cause the processor to control an additive manufacturing system (e.g., a three-dimensional printer) to form a layer of powder and to print a plurality of patches on the formed layer, each of the patches to be formed with a quantity of printing liquid, receive sensor data corresponding to at least two patches of the plurality of patches, determine for at least two of the plurality of patches, characteristics of the interaction between the printing liquid and powder in the formed layer, the determination being based on the received sensor data, and set print parameters for a subsequent printing operation based on the determined characteristics of the interaction.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

The invention claimed is:

1. A method comprising:

forming a layer of powder;

printing a plurality of patches on the layer of powder using respective quantities of a binder agent;

obtaining visual sensor data from a sensor, the visual sensor data corresponding to at least two patches of the plurality of patches in the layer of powder, wherein the layer of powder is an uppermost layer of powder;

determining characteristics of an interaction between the binder agent and powder in the layer of powder, based on the obtained visual sensor data; and setting print parameters for a subsequent printing operation based on the determined characteristics of the interaction, wherein printing the plurality of patches on the powder comprises either or both of:

forming each of the at least two patches with a corresponding respective quantity of the binder agent and over multiple printing passes, wherein a first proportion of the corresponding respective quantity deposited in a first pass for a first patch differs from a first proportion of the corresponding respective quantity deposited in the first pass for a second patch, and a second proportion of the corresponding respective quantity deposited in a second pass for the first patch differs from a second proportion of the corresponding respective quantity deposited in the second pass for the second patch; and forming each of the at least two patches with a different delay between the first pass in which the first proportion of the respective quantity of the binder agent is deposited and the second pass in which the second proportion of the respective quantity of the binder agent is deposited.

2. The method of claim 1, wherein determining the characteristics of the interaction between the binder agent and the powder in the layer of powder comprises:

determining, by processing the obtained visual sensor data, in which of the plurality of patches the binder agent has infiltrated the powder by more than a threshold; and determining which of the at least two patches was formed using a higher amount of the binder agent.

3. The method of claim 2, wherein setting the print parameters comprises setting a maximum contone level for the subsequent printing operation based on the higher amount of the binder agent.

4. The method of claim 1, further comprising:

forming an additional layer of powder on top of the layer of powder;

printing a subsequent plurality of patches on the additional layer of powder, the subsequent plurality of patches being identical to the plurality of patches; and obtaining sensor data corresponding to at least two patches of the subsequent plurality of patches.

5. The method of claim 1, wherein printing the plurality of patches on the layer of powder comprises forming each patch of the plurality of patches with the respective quantities of the binder agent within a predetermined binder agent range, the predetermined binder agent range being associated with either or both of properties of the powder of the layer of powder and an operative range associated with a dispenser of the binder agent.

6. The method of claim 1, further comprising controlling a temperature of the uppermost layer to be within a predetermined temperature range associated with the subsequent printing operation.

7. The method of claim 1, wherein setting the print parameters for the subsequent printing operation comprises one or more than one of:

setting a contone level for the subsequent printing operation;

determining a number of printing passes to be used to dispense the binder agent; and determining a proportion of the binder agent to be dispensed in each of the number of printing passes.

8. The method of claim 1, wherein printing the plurality of patches on the powder comprises at least forming each of the at least two patches with the respective quantity of the binder agent and over the multiple printing passes, wherein the first proportion of the respective quantity deposited in the first pass for the first patch differs from the first proportion of the respective quantity deposited in the first pass for the second patch, and the second proportion of the respective quantity deposited in the second pass for the first patch differs from the second proportion of the respective quantity deposited in the second pass for the second patch.

9. The method of claim 1, wherein printing the plurality of patches on the powder comprises at least forming each of the at least two patches with the different delay between the first pass in which the first proportion of the respective quantity of the binder agent is deposited and the second pass in which the second proportion of the respective quantity of the binder agent is deposited.

10. The method of claim 1, further comprising:

performing the subsequent printing operation.

11. An additive manufacturing system comprising:

a powder bed;

a build material dispenser;

a printing liquid dispenser;

a sensor;

a processor; and a memory storing instructions executable by the processor to:

control the build material dispenser to form a layer of powder;

control the printing liquid dispenser to dispense a predetermined quantity of a printing liquid such that a plurality of patches are formed on the layer of powder on the powder bed;

determine for at least two patches of the plurality of patches, characteristics of an interaction between the printing liquid and powder in the layer of powder based on visual sensor data obtained by the sensor, wherein the layer of powder is an uppermost layer of powder, and wherein the characteristics of the interaction between the printing liquid and the powder in the layer of powder based on the visual sensor data are determined by:

identifying a set of undersaturated patches and a set of oversaturated patches in the plurality of patches; and set print parameters for subsequent printing operations based on the determined characteristics of the interaction between the printing liquid and the powder, by determining a contone level based on a highest amount of the printing liquid dispensed for one of the identified set of undersaturated patches and a lowest amount of the printing liquid dispensed for one of the identified set of oversaturated patches.

12. The additive manufacturing system of claim 11, further comprising a heating device, wherein the instructions are executable by the processor to further control the heating device to heat the layer of powder to a predetermined temperature associated with the subsequent printing operations.

13. The additive manufacturing system of claim 11, wherein the sensor is a visual imaging device to obtain a plurality of visual images, each of the plurality of visual images including a visual image of at least one patch of the plurality of patches obtained a predetermined time after the predetermined quantity of the printing liquid is dispensed.

14. The additive manufacturing system of claim 11, wherein:

the printing liquid dispenser is to dispense the predetermined quantity of the printing liquid during a plurality of passes, and the predetermined quantity of the printing liquid is dispensed by dispensing at least two different quantities of the printing liquid during at least one pass of the plurality of passes.

15. The additive manufacturing system of claim 11, wherein:

the printing liquid dispenser dispenses the printing liquid during a plurality of passes of the printing liquid dispenser over the layer of powder to form the plurality of patches, and the printing liquid dispenser is controlled to incrementally modify the predetermined quantity of the printing liquid dispensed onto each of the plurality of patches over a pass of the plurality of passes.

16. The additive manufacturing system of claim 11, wherein the instructions are executable by the processor to further:

cause the subsequent printing operations to be performed.

17. A non-transitory computer-readable medium storing instructions that, when executed by a processor, cause the processor to:

control a three-dimensional printer to form a layer of powder and to print a plurality of patches on the layer of powder that are formed with respective quantities of printing liquid;

receive visual sensor data corresponding to at least two patches of the plurality of patches;

determine for the at least two patches of the plurality of patches, characteristics of interactions between the respective quantities of the printing liquid and powder in the layer of powder, based on the received visual sensor data, wherein the layer of powder is an uppermost layer of powder, and the characteristics of the interactions between the printing liquid and the powder in the layer of powder are determined by:

determining, by processing the received visual sensor data, in which of the plurality of patches the printing liquid has infiltrated the powder by more than a threshold; and determining which of the at least two patches was formed using a higher amount of the printing liquid; and set print parameters for a subsequent printing operation based on the determined characteristics of the interactions between the respective quantities of the printing liquid and the powder in the layer of powder, by setting a maximum contone level for the subsequent printing operation based on the higher amount of the printing liquid.

18. The non-transitory computer-readable medium of claim 17, wherein the instructions, when executed by the processor, further cause the processor to:

control the three-dimensional printer to perform the subsequent printing operation.

* * * * *